United States Patent Office

2,897,163
PRODUCTION OF POLYMERIC MATERIALS FROM POLYOXYALKYLENE POLYOLS AND BUTADIENE DIEPOXIDE

Jared W. Clark, Charleston, and Alfred E. Winslow, Scott Depot, W. Va., assignors to Union Carbide Corporation, a corporation of New York No Drawing. Application July 9, 1956
Serial No. 596,428

14 Claims. (Cl. 260—2)

This invention relates to a process for the production of synthetic polyhydric oxyhydrocarbon products of high molecular weight and to the products produced thereby as new compositions of matter. More particularly, this invention relates to the process for the production of such products by the reaction of a polyoxyalkylene polyol with butadiene diepoxide. The products made by this invention are hydroxyl-containing products of high molecular weights, which can range in consistency from soft, waxy materials to rigid, resinous solids, and which may be water soluble or water insoluble, depending primarily upon the amount of butadiene diepoxide employed in their preparation as hereinafter described.

According to the present invention, a polyoxyalkylene polyol, and preferably a polyoxyalkylene glycol, having an average molecular weight of at least 600 is reacted with butadiene diepoxide in the presence of catalytic amounts of an alkali metal alcoholate-forming compound for the polyoxyalkylene polyol.

The polyoxyalkylene polyols which are useful in this process are commonly produced by the polymerization of an alkylene oxide having terminal epoxy groups, such as ethylene oxide, propylene oxide, butylene oxide, and the like, on an aliphatic or an aromatic compound having preferably at least two primary hydroxyl groups, but which may contain one or more secondary hydroxyl groups. Such compounds as may be used to prepare these polyols are ethylene glycol, propylene glycol, glycerol, diethylene glycol, sorbitol, sucrose, and like polyhydroxy compounds. Preferred in this reaction are the linear chain polyoxyalkylene glycols represented by the general formula:

$$H—O(RC_2H_3—O)_n—H$$

wherein R is a member selected from the group consisting of hydrogen and lower alkyl groups having from one to three, inclusive, carbon atoms, and $n$ is an integer such that the average molecular weight of the polyglycol chain is at least 600.

Preferred of this chain are the polyoxyethylene glycols and polyoxypropylene glycols having an average molecular weight of between about 1000 and about 10,000 and more particularly preferred are the polyoxyethylene glycols.

Since these polyoxyalkylene glycols are prepared by a polymerization of the alkylene oxides, they are composed of a mixture of polyglycols of various molecular weights, to which mixtures have been assigned an average molecular weight. The determination of the average molecular weight assigned to these mixtures is ascertained by known methods of determining physical and chemical properties. For the higher members of this class of polyglycols our preferred method of assigning average molecular weights is according to a reduced viscosity measurement of a solution containing 0.20 gram of the polyoxyalkylene glycol in 100 ml. of acetonitrile and for the lower members of this class, we prefer esterification or acetylation methods.

Reduced viscosity of the polyglycols is determined according to the following formula:

$$\text{Reduced viscosity} = I_R = \frac{I - I_0}{I_0/c}$$

where $I$ = viscosity of solution
$I_0$ = viscosity of solvent
$c$ = concentration in grams per 100 ml. solvent Average molecular weight of the polyglycol is then assigned according to the reduced viscosity. For example, a polyoxyethylene glycol having a reduced viscosity in acetonitrile at 30° C. determined in the above manner of about 0.17 has been assigned an average molecular weight of about 6000 and a polyoxyethylene glycol solution having a reduced viscosity of 0.08 determined in the same manner has been assigned an average molecular weight of about 4000. A polyoxyethylene glycol solution having a reduced viscosity of about 0.02 determined in the same manner has an assigned molecular weight of about 1000, but with the materials exhibiting such low reduced viscosities, we prefer to make the determination of molecular weight by an esterification method.

This method briefly consists of esterifying a 7½ gram sample of the polyoxyethylene glycol (dissolved in pyridine to make 25 ml.) by the addition of 25 ml. of a solution prepared by dissolving 42 grams of phthalic anhydride in 300 ml. of freshly distilled pyridine. After heating to about 98° C. for 30 minutes, the samples are cooled and 50 ml. of 0.5 N sodium hydroxide added. The same procedure is followed on a blank containing no polyglycol. Samples and blanks are titrated to a neutral end point with additional 0.5 N sodium hydroxide. Average molecular weight is then calculated according to the formula:

$$\text{Avg. mole. wt.} = \frac{2000 \times S}{(B - A) \times N}$$

were $A$ = ml. of N normal NaOH for sample
$B$ = ml. of N normal NaOH for blank
$S$ = original sample weight in grams The butadiene diepoxide functions in this invention both as a chain extender between polyoxyalkylene polyol chains and as a cross-linking agent. According to our experience, primary hydroxyl groups of the polyoxyalkyl polyol react preferentially with the butadiene diepoxide to link up the polyglycol chains, creating secondary hydroxyl groups upon opening of the epoxide ring. The resultant product can undergo still further linking on the primary and secondary hydroxyl groups present in the reaction mixture with the epoxy groups of the butadiene diepoxide creating linear and cross-linked structures. The reaction of the primary hydroxyl groups can be represented by the following scheme, shown here for the purposes of illustration only, to produce a linear product from a polyoxyalkylene glycol.

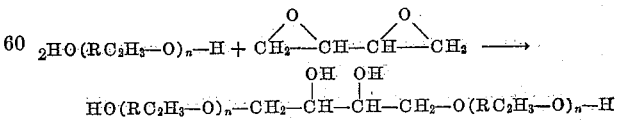

In this manner, additional butadiene diepoxide can link up with the product thus formed, another polyoxyalkylene glycol chain on the primary hydroxyl groups of the polyoxyalkylene residue in a similar way, or can react with secondary hydroxyl groups thus created to form a branched chain polymer. The initial products will be predominantly linear. As the concentration of secondary hydroxyl groups increases, branching and cross-linking between chains increases.

Thus it is possible under this invention to obtain useful products having average molecular weights many fold over those of the starting polyoxyalkylene glycols. These products are high molecular weight polyhydric oxyhydrocarbons which can be substantially linear in structure or can be substantially cross-linked, depending primarily upon the molar ratio of butadiene diepoxide to polyglycol employed in their preparation.

Products which are primarily linear in structure and derived from polyoxyethylene glycols are soft amorphous wax-like materials which exhibit a high degree of water-solubility. With an increase in the degree of cross-linking present in the product, the water solubility decreases and the rigidity increases. We have found that products can be prepared having three or more times the average molecular weight of the starting polyglycol compound and still be water soluble.

When the polyoxyalkylene polyols having secondary hydroxyl groups are employed in this reaction, the reaction of the epoxy groups follows the same mode, with primary hydroxyl groups reacting preferentially to link up polyoxyalkylene polyol chains. Cross-linking can also take place by the reaction of the original and/or created secondary hydroxyl groups to produce similar products to those made from the polyglycols.

The butadiene diepoxide can be used in the process of this invention in amounts of from about 0.2 to about 20 moles per mole of polyglycol. Products made using over 20 moles of the polyepoxy compound per mole of the polyglycol are extremely brittle and of little commercial value. Products made using less than about 0.2 mole of butadiene diepoxide per mole of polyglycol or polyol do not exhibit the properties of the compositions of the invention and are not considered a part thereof. Within the range of butadiene diepoxide herein employed, the products vary from water-soluble, soft, waxy or gum-like materials having good lubricating, suspending, and thickening properties in the lower molecular concentrations of butadiene diepoxide employed in the reaction, to rigid, water-insoluble resinous solids suitable for molding, casting, and machining in the higher molecular concentrations of butadiene diepoxide. The soft, water-soluble waxes are particularly useful as lubricants for molding and extruding, and as dispersing agents, suspending agents, coagulating agents, surface active agents, and thickeners for aqueous mixtures, while the more rigid water-insoluble polymers are useful coating and textile sizing agents and as binding, laminating, and casting compositions.

The temperature at which the reaction of the butadiene diepoxide with the polyol is carried out is not narrowly critical and can range from about 25° C. to about 250° C. It is preferred that the reaction be carried out with the polyol in the liquid state but below the decomposition temperature of the reactants and products. For most reactions, a temperature of 50° C. to about 150° C. is preferred. Inert diluents or solvents can be employed to enable mixing of the reactants at temperatures below the melting point of the polyglycol. Such inert solvents as dioxane, the diethyl ethers of ethylene and diethylene glycol, and benzene, toluene, and xylene can be employed for this purpose. It is preferred that in this process less than 50 percent of the reaction mixture constitutes the solvent, and more advantageously between about 10 to about 40 percent.

The reaction is conveniently carried out at atmospheric pressure, although pressures both above and below atmospheric can be employed. It is desirable to exclude air during the reaction by employing an inert atmosphere such as nitrogen to cover the reaction mixture to prevent or inhibit any degration of the product or deactivation of the catalyst.

We have found that the compounds which serve to promote the condensation of the butadiene diepoxide with the polyoxyalkylene glycol are the alkali metal alcoholates of the polyoxyalkylene glycol. By the term alkali metal alcoholates of the polyoxyalkylene glycol, we mean the polyoxyalkylene materials where on or more of the hydroxyl groups are converted to an alkali metal alcoholate group by the reaction of the polyglycol with catalytic amounts of an alkali metal alcoholate-forming compound such as the alkali metals, alkali metal oxides, alkali metal hydroxides, alkali metal hydrides, alkali metal alcoholates, and the like.

It is not critical to the operation of our invention that these alcoholates be prepared in any particular manner. The presence of an alkali metal alcoholate-forming compound with the polyglycol is sufficient to cause reaction, although the application of mild heat is advantageous for faster reaction. The alcoholate of the polyglycol can be prepared in situ by adding the alkali metal alcoholate-forming compound to the polyglycol immediately prior to the reaction with the polyepoxy compound, or the alcoholate may be made elsewhere and stored until used in this process.

As is the case with most catalysts, the precise function of the alkali metal alcoholate of the polyglycol reactant is not completely understood, but such understanding is not critical to the practice of this invention. It is presumed that some of the alkali metal alcoholate groups may enter into the reaction, similar to the action of hydroxyl groups with the butadiene diepoxide. It is not necessary, and in fact, not desirable, to employ the alcoholate-forming compound in amounts theoretically necessary to convert both hydroxyl groups of the polyglycol compound to the alcoholate groups.

We have discovered that under substantially anhydrous conditions, the alkali metal alcoholates of the polyglycol reactant made using metallic sodium or potassium, promote the reaction of the butadiene diepoxide and the polyoxyalkylene compound. Surprisingly enough, we found that minor amounts of water in the reaction mixture can be tolerated, so that the aqueous solutions of alkali metal hydroxides can be employed as the alcoholate-forming compound with excellent success.

However, when any of the named alkali metal alcoholate-forming compounds are employed in this reaction, there may also be present the alkali metal hydroxide formed by the reaction of the alcoholate-former with moisture present in the polyglycol, or with water formed as a by-product of the reaction of the polyglycol with the alcoholate-former. It is contemplated that some catalytic activity may be attributable to the presence of the alkali metal hydroxide.

Sodium and potassium hydroxide are the preferred alcoholate-forming compounds in this process. They are easy to handle and are effective in low concentrations in promoting the reaction.

Amounts of the alkali metal alcoholate-forming compound of as low as about 0.05 percent of the weight of the polyglycol have been found to be effective in converting sufficient hydroxyl groups of the polyglycol to the alcoholate group for promoting the reaction, with amounts of about 0.1 percent to about 0.5 percent being preferred, although greater amounts can be employed.

The order for adding the reactants and catalyst is not critical in the operation of this process. One reactant can be added to a mixture of the other reactant and the catalyst, or the catalyst can be added to the mixture of the two reactants. The addition may be continuous, in small successive amounts, or in one large amount.

It is, of course, permissible to interrupt the reaction by adding a chain stopping agent, or by neutralizing the reaction mixture. An acid such as phosphoric acid can be added to neutralize the mixture and stop the reaction. Such methods are particularly useful in controlling the physical properties or molecular weight of the products.

Our preferred method of making the water-soluble high molecular weight products consists of heating a polyoxyethylene glycol having an average molecular weight of about 6000 to a temperature of about 65° C.–100° C. in an atmosphere such as nitrogen, and dissolving in it about 0.2 to about 0.5 percent by weight of the polyglycol of sodium or potassium hydroxide added as a 50 percent aqueous solution. Reaction takes place when about 0.2 to 0.5 mole of butadiene diepoxide per mole of polyoxyethylene glycol is thoroughly mixed in the polyglycol-catalyst mixture. A rise in viscosity is evident in about 5–10 minutes, indicating formation of higher molecular weight polymeric materials. The catalyst need not be removed from the reaction mixture, although if desired, it can be neutralized with an acid such as phosphoric acid when the desired viscosity is reached.

These products are waxy or gum-like in appearance, soluble in water and acetonitrile, and appear from their characteristics to be predominantly linear polymeric products. These products have good lubricating qualities, and serve efficiently as suspending, thickening, dispersing, and coagulating agents for aqueous solutions and the like. The products are easily flaked and granulated in conventional resin handling equipment. Aging of the water-soluble, waxy products does not affect their solubility or other physical properties.

Our preferred process for making the water-insoluble resinous products consists of heating a polyoxyethylene glycol having an average molecular weight of about 6000 to a temperature of about 65° C.–100° C. in an inert atmosphere such as nitrogen and dissolving in it 0.2 to 0.5 percent by weight of sodium or potassium hydroxide added as a 50 percent aqueous solution. Reaction takes place when at least one and a half moles and preferably about two moles or more of butadiene diepoxide per mole of polyoxyethylene glycol are thoroughly mixed with the glycol-catalyst solution. Reaction is rapid and the mixture can be immediately cast in a mold. It is preferred that the resin be cured by heating in an oven at about 90° C.–100° C. for 2–20 hours to assure complete reaction, although slow curing does take place at room temperature.

These rigid resinous products are insoluble in water and acetonitrile, being somewhat flexible and having high impact strengths and low brittle temperatures in the lower concentrations of butadiene diepoxide employed, and are substantially cross linked. It has been found that our preferred water-insoluble resinous materials are made using about 1.5 or more moles of butadiene diepoxide per mole of polyglycol, and the preferred water-soluble compounds are made using less than 1.5 moles of butadiene diepoxide per mole of polyoxyalkylene polyol.

However, as with most polymerization products, no exact line of demarcation exists between the water-soluble and water-insoluble products in relation to molecular concentration of polyepoxy compound used. Thus a high-impact strength resin, substantially insoluble in water, was obtained with 1.4 moles of butadiene diepoxide, which was slightly flexible, although it could be machined. Rigid resins can be prepared by the use of higher ratios of butadiene diepoxide to polyglycol with consequent increase in the degree of cross-linking. The cross-linked structures have improved dimensional stability and high impact strengths. The rigid resins are easily machined, or can be made into various molded shapes, being dimensionally stable over a wide temperature range.

This application is a continuation-in-part of our earlier application Serial No. 540,636, filed October 14, 1955.

The following examples are illustrative.

*Example 1*

One thousand grams of polyoxyethylene glycol having an average molecular weight of about 6000 was melted in a nitrogen atmosphere, and nine grams of aqueous 50 percent potassium hydroxide was added and allowed to dissolve with stirring. After holding the solution at a temperature of between 50° C. and 70° C. overnight under nitrogen atmosphere, a 136-gram portion of this solution was heated to 78° C., and 1.36 grams of butadiene diepoxide were quickly added. This corresponds to a molar ratio of 0.7:1 of butadiene diepoxide to the polyoxyethylene glycol. The temperature was held between 78° C.–120° C. for 15 minutes, then at 97° C. for 45 minutes, and then permitted to cool to room temperature and solidify.

A solution prepared by dissolving 54.5 grams of the solid product in 163.5 grams of water contained only traces of an insoluble gel, while the product was completely soluble in acetonitrile. A solution of 0.2 gram of the product in 100 ml. of acetonitrile had a reduced viscosity of 0.61 at 30° C.

*Example 2*

To 250 grams of a polyoxypropylene glycol having an average molecular weight of about 2000 maintained at 90° C. in a nitrogen atmosphere by continually admitting nitrogen to the free space above the polyoxypropylene glycol, 3.07 grams of aqueous 50 percent potassium hydroxide was added and dissolved, and 15.4 grams of butadiene diepoxide was added and mixed three minutes at this temperature. This amount corresponds to a molar ratio of 1.4:1 of butadiene diepoxide to polyoxypropylene glycol. A quantity of the reaction mixture sufficient for viscosity observations was poured into an eight-ounce wide-mouth bottle, and maintained at 194° F. by immersion in a circulating constant temperature bath. Nitrogen was continually passed over the surface of the liquid. Viscosity readings, using a Brookfield viscometer, indicated an increase from 80 to 400 centipoises in 2½ hours following addition of the diepoxide. The viscosity sample was then sealed in the bottle, after displacing most of the air with nitrogen, and heated in an oven 21 hours at 80° C. to 90° C. The product maintained a gelatinous consistency when allowed to cool to room temperature. It was extensively cross-linked as indicated by only moderate swelling when a small sample was immersed for one hour in acetonitrile at 80° C., and was not soluble in water.

*Example 3*

To 400 grams of polyoxyethylene glycol having an average molecular weight of about 6000, maintained at 90° C. in an inert atmosphere, 0.45 gram of anhydrous sodium methylate was added with stirring. After stirring for 2½ hours at 89° C., 7.8 grams of butadiene diepoxide were then added to the mixture with vigorous agitation. This amount corresponds to a molar ratio of 1.4:1 of butadiene diepoxide to polyoxyethylene glycol. After three minutes, the resulting mixture was divided, with part being charged to an eight-ounce, wide-mouth bottle for viscosity measurements and the remainder of the mixture was transferred to an eight-inch square mold ½ inch deep and placed in a constant temperature oven at 90° C. Viscosity measurements of the sample charged to the wide-mouth bottle indicated the viscosity reached 95,000 centipoises at 200 F. 18 minutes after addition of the diepoxide. Physical properties of the hard resinous material after being cured in the mold for 18 hours at 90° C. are as follows: tensile strength, 2275 p.s.i.; elongation, zero; ASTM stiffness modulus, 3900 p.s.i.; $T_f$, −7° C.; $T_4$, +37° C.; brittle temperature, −30° C.; Shore hardness, 85. ($T_f$ on an ASTM torsional stiffness curve corresponds to a point at 135,000 p.s.i. and $T_4$ corresponds on the same curve to a point at 10,000 p.s.i.)

*Example 4*

To 1000 grams of a polyoxyethylene glycol having an average molecular weight of approximately 6000 maintained at a temperature of 69° C. to 73° C. in an inert atmosphere of nitrogen, 2.0 grams of solid potassium were slowly added during a period of 12 minutes. Reaction of the potassium was completed at a temperature of 73° C. to 77° C. in 45 minutes, as evidenced by its complete disappearance in the solution. Three hundred sixty grams of this solution were poured into a wide-mouth bottle, and 7.18 grams of butadiene diepoxide added, and mixed by stirring manually for two minutes. This amount corresponds to a molar ratio of 1.4:1 of butadiene diepoxide to polyoxyethylene glycol. Part of the reaction mixture was then poured into a one-inch by seven-inch test tube lined with thin-walled rubber tubing, and the remainder was poured into an eight inch square mold. Both samples were covered and heated in a constant temperature oven at 90° C. for 17 hours. A brief inspection after the first hour in the oven revealed that the samples were soft and therefore incompletely cured. The final products, which were firm transparent yellow gels, were transformed to light tan-colored solids when allowed to cool to room temperature. The cast samples were shaped to desired dimensions by a milling machine for physical property evaluations. The cylindrical sample was used for determination of heat distortion and Izod impact values, and the plaque used for determination of the following properties: tensile strength, 2050 p.s.i.; elongation, 5%; ASTM stiffness modulus, 50,700 p.s.i.; $T_f$, —41° C.; brittle temperature, —42° C.; Shore hardness, 90; flexural modulus, 102,000 p.s.i. The Izod impact value was 22.2 ft. lbs. and the heat distortion temperature at 264 p.s.i. fiber-stress was 50.1° C. ($T_f$ on an ASTM torsional stiffness curve corresponds to a point at 135,000 p.s.i.)

*Example 5*

A polyoxyethylene polyol derivative was prepared from sucrose and ethylene oxide using sodium methylate as a catalyst and benzene as a solvent. The sodium methylate was prepared by agitating 0.85 gram of metallic sodium in a solution containing 25 grams of methanol and 25 grams of benzene until the sodium dissolved. To the sodium methylate solution was added about 470 grams of additional benzene and 171 grams of sucrose which had passed through a 35-mesh screen. Methanol was removed from the resulting mixture by distillation in a fractionating column until the head temperature reached 80° C. The resulting slurry, containing 171 grams of sucrose, 439 grams of benzene and sodium alcoholate catalyst equivalent to 0.85 gram of sodium, was charged to an Adkins rocker bomb for hydroxyethylation. Air was removed from the internal atmosphere of the bomb by pressuring ten times successively to 300 p.s.i. with nitrogen and releasing same. Ethylene oxide in amount of 650 grams was fed during four hours to the agitated mixture at a temperature of 115° C. to 123° C. and pressure of 100 to 150 p.s.i. Fifteen grams of ethylene oxide were recovered after cooling the bomb and venting it through traps cooled in Dry Ice-acetone mixture. The product mixture of 1218 grams yielded 20 grams (wet weight) of white sediment which was removed by decantation. Benzene and unreacted ethylene oxide were removed from the product by stripping and final heating at 100° C. for 1.0 hour at 10 mm. pressure. The residue product of 740 grams was a clear, light brown syrup which yielded negligible solids upon filtration through a "C" porosity fritted glass funnel. The average molecular weight of the product was about 1480 based on product and charging weights. The filtered product contained the equivalent of 0.24 gram of sodium determined by titration with 0.500 normal hydrochloric acid, and had the following physical properties: a viscosity of 2579 centistokes at 20° C.; specific gravity of 1.1960 at 20/20° C.; and $n_D^{20}$ of 1.4840.

An additional 0.85 gram of metallic sodium was added to 468 grams of the above residue product and the mixture was heated to 100° C. in an atmosphere of nitrogen until all the sodium dissolved. An additional 171 grams of sucrose which had passed through a 35-mesh screen was mixed with the syrup. Six hundred grams of the resulting mixture containing 160.4 grams of the new sucrose was charged to a 6780 cc. type of 347 stainless steel autoclave equipped with a three-inch paddle and with a belt drive arranged to rotate the paddle at 287 r.p.m. Air was removed from the internal atmosphere of the autoclave by pressuring 25 times successively with high purity nitrogen and releasing same. Ethylene oxide in the amount of 1003 grams was fed during 8.5 hours to the agitated mixture at a temperature of 105° C. to 123° C. and pressure of 80 to 130 p.s.i. The reaction was interrupted after the first hour of this period by an overnight shutdown. Fifteen grams of ethylene oxide were recovered at the end of the 8.5 hour reaction period after cooling the bomb and venting it through traps cooled by Dry Ice-acetone mixture. The product mixture of 1577 grams yielded 67 grams (wet weight) of solid material which had the appearance of unreacted sucrose when filtered through a "C" porosity fritted glass funnel. The filtrate had a viscosity of 825 centistokes at 20° C.; specific gravity of 1.1450 at 20/20° C., and $n_D^{20}$ of 1.4754. The average molecular weight of the filtered product was presumed to be slightly above 1970 based on product and charging weights.

Metallic potassium amounting to 0.2 gram was stirred and heated at 100° C. in an internal atmosphere of nitrogen with 90 grams of the hydroxyethylated sucrose prepared in the preceding manner until the potassium dissolved. The solution was cooled to 50° C. at which temperature 10 grams of butadiene diepoxide was added and stirring was continued for five minutes. A portion of the resulting solution was transferred to an open Teflon pan and heated in a 90° C. constant temperature oven for 65 minutes. A yellow, hard, brittle resin was obtained.

*Example 6*

A mixture of 448.5 grams of a polyoxyethylene glycol having an average molecular weight of about 6000 and 1.5 grams of a 50 percent aqueous potassium hydroxide solution was mixed with 18.1 grams of butadiene diepoxide at 82° C. This amounts to a molar ratio of 2.8:1 of butadiene diepoxide to polyoxyethylene glycol. After three minutes of reaction at this temperature, a portion of the reaction mixture was poured into a wide mouth bottle for viscosity measurements and the remainder poured into an 8" x 8" x ½" mold. Viscosity measurements at 196° F. to 200° F. indicated a viscosity increase to above 100,000 centipoises, as measured by a Brookfield viscometer, within thirteen minutes after the addition of the butadiene diepoxide.

The molded sample was cured at 86° C. for sixteen hours. The sample on cooling was a tough translucent solid having the following properties: tensile strength, 2000 p.s.i.; no elongation; ASTM stiffness modulus, 33,060 p.s.i.; $T_f$, —35° C.; $T_4$, +29° C.; brittle temperature, —36° C.; Shore hardness, 96.

*Example 7*

To 2000 grams of a polyoxyethylene glycol having an average molecular weight of about 6000 heated to 75° C., there was slowly added 4.0 grams of solid potassium over a period of five minutes to form a potassium alcoholate of the polyglycol. The temperature was maintained between 75° C. and 83° C. during the addition. The potassium completely reacted in 45 minutes, with the final temperature reading of 90° C. The product, the potassium alcoholate of the polyoxyethylene glycol, was permitted to cool to room temperature.

Two hundred fifty two grams of this potassium alcoholate of the polyglycol was heated to 70° C. and mixed with 4.99 grams of butadiene diepoxide. After two minutes of reaction, the mixture was poured into an 8" x 8" x ½" mold and allowed to cool to room temperature. The resulting plaque was sealed in aluminum foil and stored at room temperature for 42 days. The aged product had the following properties: tensile strength, 750 p.s.i.; no elongation; ASTM stiffness modulus, 63,000 p.s.i.; $T_f$, −15° C.; $T_4$, +47° C.; Shore hardness, 90+.

We claim:

1. A process for producing a high molecular weight polyhydric oxyhydrocarbon product which comprises heating and reacting a polyoxyalkylene glycol having an average molecular weight of at least 600 with butadiene diepoxide in the presence of an alkali metal alcoholate of the polyoxyalkylene glycol, said butadiene diepoxide being present in amounts from about 0.2 mole to about 20 moles per mole of polyoxyalkylene glycol at a temperature of from about 25° C. to about 250° C.

2. A process according to claim 1 wherein the polyoxyalkylene glycol is polyoxyethylene glycol.

3. A process according to claim 1 wherein the alkali metal alcoholate of the polyoxyalkylene glycol is prepared from an alkali metal hydroxide.

4. A process for producing a high molecular weight polyhydric oxyhydrocarbon product which comprises heating and reacting a polyoxyalkylene polyol having an average molecular weight of at least 600 with from about 0.2 mole to about 20 moles of butadiene diepoxide per mole of polyoxyalkylene polyol, in the presence of a catalytic amount of an alkali metal alcoholate of the polyoxyalkylene polyol at a temperature between 25° C. and 250° C.

5. A process according to claim 4 wherein the alkali metal alcoholate of the polyoxyalkylene polyol is prepared from catalytic amounts of an alkali metal hydroxide.

6. A high molecular weight polymeric product made by reacting a polyoxyalkylene polyol having an average molecular weight of at least 600 with from about 0.2 mole to about 20 moles of butadiene diepoxide per mole of polyoxyalkylene polyol at a temperature between about 25° C. to about 250° C. in the presence of a catalytic quantity of an alkali metal alcoholate of the polyoxyalkylene polyol.

7. A high molecular weight polyhydric oxyhydrocarbon product made by heating and reacting a polyoxyalkylene glycol having an average molecular weight of at least 600, in the presence of a catalytic quantity of an alkali metal alcoholate of said polyoxyethylene glycol, with butadiene diepoxide in amounts from about 0.2 mole to about 20 moles per mole of polyoxyalkylene glycol at a temperature between about 25° C. to about 250° C.

8. A high molecular weight polyhydric oxyhydrocarbon product made by heating and reacting a polyoxyethylene glycol having an average molecular weight of at least 600, in the presence of a catalytic quantity of an alkali metal alcoholate of said polyoxyethylene glycol, with butadiene diepoxide in amounts of between about 0.2 mole and about 20 moles per mole of polyoxyethylene glycol at a temperature of 50° C. to about 150° C.

9. A high molecular weight polyhydric oxyhydrocarbon made by heating and reacting butadiene diepoxide with a polyoxyethylene glycol having an average molecular weight of at least 600 in the presence of alkali metal alcoholates of the polyoxyethylene glycol prepared from catalytic amounts of an alkali metal compound with the polyoxyethylene glycol at a temperature between 50° C. to about 150° C.

10. A high molecular weight polyhydric oxyhydrocarbon made by heating and reacting butadiene diepoxide with a polyoxyethylene glycol having an average molecular weight of at least 600 in the presence of at least 0.05 percent of the weight of the polyoxyethylene glycol of an alkali metal hydroxide, said butadiene diepoxide present in amounts of from about 0.2 mole to 20 moles per mole of polyoxyethylene glycol.

11. A waxy, gum-like polymeric water-soluble product made by heating and reacting butadiene diepoxide with a polyoxyethylene glycol having an average molecular weight of between 1,000 and 10,000 in the presence of a catalytic quantity of alkali metal alcoholate of said polyoxyalkylene glycol, said butadiene diepoxide being present in amounts of between about 0.2 mole and about 1.5 moles per mole of the polyoxyalkylene glycol.

12. A rigid resinous water-insoluble polymeric product made by heating and reacting butadiene diepoxide with a polyoxyalkylene glycol having an average molecular weight of between 1000 and 10,000 in the presence of a catalytic quantity of alkali metal alcoholate of said polyoxyalkylene glycol, said butadiene diepoxide present in amounts from about 1.5 moles to about 20 moles per mole of polyoxyalkylene glycol.

13. A waxy, gum-like, water-soluble polyhydric oxyhydrocarbon made by heating and reacting butadiene diepoxide with a polyoxyethylene glycol having an average molecular weight of between 1000 and 10,000 in the presence of catalytic amounts of alkali metal alcoholate groups on the polyoxyethylene glycol, said butadiene diepoxide being present in amounts of between about 0.2 mole and about 1.5 moles per mole of the polyoxyethylene glycol said reaction conducted at a temperature between about 50° C. and 150° C.

14. A rigid resinous water-insoluble polyhydric oxyhydrocarbon made by heating and reacting butadiene diepoxide with a polyoxyethylene glycol having an average molecular weight of between 1000 and 10,000 in the presence of catalytic amounts of alkali metal alcoholate groups on the polyoxyethylene glycol, said butadiene diepoxide present in amounts of from about 1.5 moles to about 20 moles per mole of polyoxyethylene glycol said reaction conducted at a temperature between about 50° C. and 150° C.

References Cited in the file of this patent

UNITED STATES PATENTS

| | | |
|---|---|---|
| 2,674,619 | Lunsted | Apr. 6, 1954 |
| 2,668,805 | Greenlee | Feb. 9, 1954 |
| 2,731,444 | Greenlee | Jan. 17, 1956 |